United States Patent
Hoshino et al.

(10) Patent No.: US 6,919,713 B2
(45) Date of Patent: Jul. 19, 2005

(54) SWITCHING POWER SUPPLY UNIT

(75) Inventors: Taichi Hoshino, Kyoto (JP); Eitaro Oyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/681,021

(22) Filed: Oct. 7, 2003

(65) Prior Publication Data

US 2004/0070376 A1 Apr. 15, 2004

(30) Foreign Application Priority Data

Oct. 11, 2002 (JP) .......................................... 2002-298365

(51) Int. Cl.[7] .............................................. G05F 1/577
(52) U.S. Cl. ..................................................... 323/267
(58) Field of Search ................................ 323/255, 265, 323/267, 328, 340

(56) References Cited

U.S. PATENT DOCUMENTS

| | | | | |
|---|---|---|---|---|
| 3,641,424 A | * | 2/1972 | Kuykendall | 323/286 |
| 3,745,443 A | * | 7/1973 | Weil | 323/267 |
| 4,093,877 A | * | 6/1978 | Pollmeier | 327/109 |
| 6,388,430 B1 | * | 5/2002 | Eldridge | 323/255 |

FOREIGN PATENT DOCUMENTS

| | | |
|---|---|---|
| JP | 7-111778 | 4/1995 |
| JP | 9-266665 | 10/1997 |
| JP | 10-150767 | 6/1998 |
| JP | 11-18426 | 1/1999 |
| JP | 11-150875 | 6/1999 |

* cited by examiner

*Primary Examiner*—Adolf Berhane
(74) *Attorney, Agent, or Firm*—Merchant & Gould P.C.

(57) ABSTRACT

Accumulation and emission of energy in and from a coil having an intermediate tap is controlled by switching a DC input voltage from a DC power source on and off. Controlled voltages generated at a plurality of terminals are rectified and smoothed to output a plurality of DC output voltages. Connection to a reference voltage is controlled such that the voltages generated at the plurality of terminals are not dependent on the DC input voltage during the on-off switching. Therefore, a switching power supply unit is provided in which a coil having an intermediate tap is used to allow a simple configuration, to convert a DC input voltage into a plurality of DC output voltages with high efficiency, and to achieve compactness.

15 Claims, 8 Drawing Sheets

SWITCHING POWER SUPPLY UNIT

BACKGROUND OF THE INVENTION

1. Field of the Invention

The present invention relates to a switching power supply unit that switches an input voltage to generate one or plural output voltages having different values.

2. Description of the Related Art

Portable telephones, digital cameras, PDAs, and personal computers require a plurality of DC voltages having different voltage values as power supply voltages for LCDs (liquid crystal displays) and CCDs (charge-coupled devices).

A transformer is normally used in a power supply unit for obtaining a plurality of DC voltages. A DC power supply unit has a configuration in which a DC input voltage applied to a primary winding of such a transformer is switched by a PWM control signal and a voltage induced at a secondary winding is rectified and smoothed to output a plurality of DC output voltages.

The power supply unit utilizing a transformer has low converting efficiency (e.g., about 50 to 70%) as a power supply unit and is large-sized because the secondary winding has a great number of turns and hence a small diameter in order to achieve strong magnetic coupling between the primary winding and the secondary winding.

Power supply circuits have been proposed which employ two inductors or an inductor having an intermediate tap to obtain a plurality of output voltages (see Patent Document 1, for example). However, the power supply circuits are complicated in circuitry because a multistage charge pump circuit is provided to obtain one output voltage. Loss in the charge pump circuit reduces efficiency, and the circuit requires an extra space which results in an increased size. Referring to the characteristics of each output voltage relative to the input voltage (line regulation), an output voltage that is not feedback-controlled has input voltage dependence.

JP-A-10-150767 is known as a related reference.

Since the switching power supply units according to the related art are low in conversion efficiency and are large-sized as thus described, they have problems when used as power supply units of portable apparatus which must be compact and lightweight and whose battery power supply must have a long life. They have another problem in that each output voltage cannot be kept at a predetermined value at the time of a voltage drop of the battery power supply because it has input voltage dependence.

SUMMARY OF THE INVENTION

Under the circumstances, an object of the invention is to provide a switching power supply unit for generating one or plural DC output voltages having different values by switching a DC input voltage, in which a coil having an intermediate tap is used to achieve a simple configuration including no extra additional circuit such as a charge pump circuit, to convert a DC input voltage to predetermined DC output voltages high-efficiently, and to achieve compactness.

Another object of the invention is to improve output voltage versus input voltage characteristics (line regulation) of the one or plural DC output voltages, thereby substantially eliminating input voltage dependence.

The invention provides a switching power supply unit having: a coil L having a first terminal A to which a DC input voltage Vin is applied, a second terminal B from which a first output voltage is outputted, and an intermediate tap T from which a second output voltage is outputted; a first switch Q1 whose on-off state is controlled by an on-off control signal PWM, which is connected between said intermediate tap T or said second terminal B and a common potential point; a first rectifying-smoothing circuit D1,C1, which is connected to said second terminal B, for rectifying and smoothing said first output voltage to output a first DC output voltage obtained by converting said DC input voltage Vin; a second rectifying-smoothing circuit D2,C2, which is connected to said intermediate tap T, for rectifying and smoothing said second output voltage to output a second DC output voltage obtained by converting said input DC voltage; and control means CONT for outputting said on-off control signal PWM in order to control at least one of said first and second DC output voltages to be a constant voltage.

Moreover, the switching power supply unit further has: a second switch Q2 whose on-off state is controlled to apply said DC input voltage Vin to said first terminal A; and a rectifier element D3, which is connected between said first terminal A and said common potential point such that it has polarity to block said DC input voltage Vin, for rectifying the DC input voltage Vin, wherein said control means CONT outputs said on-off control signal PWM such that said second switch is simultaneously switched with said first switch Q1.

Furthermore, said second switch Q2 is switched according to said on-off control signal PWM and said first switch Q1 is switched according to a voltage at said first terminal A.

The invention provides a switching power supply unit has: a first switch Q1 whose on-off state is controlled by an on-off control signal PWM, which outputs a DC input voltage Vin according to the on-off state; a coil L having a first terminal A to which the DC input voltage Vin is applied, a second terminal B from which a first output voltage is outputted, and an intermediate tap T from which a second output voltage is outputted; a rectifier element D1, which is connected between said first terminal A and a common potential point such that it has polarity to block said DC input voltage Vin, for rectifying the DC input voltage Vin; a smoothing circuit C1, which is connected to said second terminal B, for smoothing said first output voltage to output a first DC output voltage obtained by decreasing said DC input voltage Vin; a rectifying-smoothing circuit D2,C2, which is connected to said intermediate tap T, for rectifying and smoothing said second output voltage to output a second DC output voltage obtained by decreasing said DC input voltage Vin; and control means CONT for outputting said on-off control signal PWM in order to control at least one of said first and second DC output voltages to be a constant voltage.

The invention provides a switching power supply unit has: a first switch Q1 whose on-off state is controlled by an on-off control signal PWM, which outputs a DC input voltage Vin according to the on-off state; a coil L having a first terminal A to which the DC input voltage Vin is applied, a second terminal B from which a first output voltage is outputted, and an intermediate tap T from which a second output voltage is outputted; a rectifier element D1, which is connected between said first terminal A and a common potential point such that it has polarity to block said DC input voltage Vin, for rectifying the DC input voltage Vin; a smoothing circuit C1, which is connected to said second terminal B, for smoothing said first output voltage to output a first DC output voltage obtained by decreasing said DC input voltage Vin; a smoothing circuit C2, which is connected to said intermediate tap T through a second switch Q2 that is tuned off or on substantially oppositely to the turning on or off of said first switch Q1, for smoothing said second output voltage to output a second DC output voltage obtained by decreasing said DC input voltage Vin; and control means CONT for outputting said on-off control signal PWM in order to control at least one of said first and second DC output voltages to be a constant voltage.

Furthermore, said second switch Q2 is switched according to a voltage at said first terminal A.

The invention provides a switching power supply unit has: a first switch Q1 whose on-off state is controlled by an on-off control signal, which outputs a DC input voltage Vin according to the on-off state; a coil L having a first terminal A to which the DC input voltage Vin is applied, a second terminal B from which a first output voltage is outputted, and an intermediate tap T connected to a common potential point; a first rectifying-smoothing circuit D1,C1, which is connected to said second terminal B, for rectifying and smoothing said first output voltage to output a DC output voltage obtained by converting said DC input voltage Vin; and control means CONT for outputting said on-off control signal PWM in order to control said DC output voltage to be a constant voltage.

Moreover, the switching power supply unit has a second rectifying-smoothing circuit D2,C2, which is connected to said first terminal A, for outputting a voltage with reversed polarity of the DC output voltage outputted from said first rectifying-smoothing circuit D1,C1, wherein said first rectifying-smoothing circuit D1,C1 outputs a DC output voltage of the same polarity as the polarity of said DC input voltage Vin, and said second rectifying-smoothing circuit D2,C2 outputs a DC output voltage of different polarity as the polarity of said DC input voltage Vin.

The invention provides a switching power supply unit has: a first switch Q1 whose on-off state is controlled by an on-off control signal PWM, which outputs a DC input voltage Vin according to the on-off state; a coil L having a first terminal A to which the DC input voltage Vin is applied, a second terminal B connected to a common potential point, and an intermediate tap T from which a first output voltage is outputted; a first rectifying-smoothing circuit D1,C1, which is connected to said intermediate tap T, for rectifying and smoothing said first output voltage to output a first DC output voltage of polarity different from the polarity of said DC input voltage Vin; a second rectifying-smoothing circuit D2,C2, which is connected to said first terminal A, for rectifying and smoothing said second output voltage to output a second DC output voltage of polarity different from the polarity of said DC input voltage Vin; and control means CONT for outputting said on-off control signal PWM in order to control at least one of said first and second DC output voltages to be a constant voltage.

The invention provides a switching power supply unit has: a first switch Q1 whose on-off state is controlled by an on-off control signal PWM, which outputs a DC input voltage Vin according to the on-off state; a coil L having a first terminal A to which the DC input voltage Vin is applied, a second terminal B from which a first output voltage is outputted, and an intermediate tap T from which a second output voltage is outputted; a rectifier element D1, which is connected between said first terminal A and a common potential point such that it has polarity to block said DC input voltage Vin, for rectifying the DC input voltage Vin; a smoothing circuit C2, which is connected to said intermediate tap T, for smoothing said second output voltage to output a first DC output voltage obtained by decreasing said DC input voltage Vin; a rectifying-smoothing circuit D1,C1, which is connected to said second terminal B, for rectifying and smoothing said first output voltage to output a second DC output voltage higher than said first DC output voltage outputted from said smoothing circuit C2; and control means CONT for outputting said on-off control signal PWM in order to control said first DC output voltage outputted from said smoothing circuit C2 to be a constant voltage.

Moreover, said coil L has one or more further intermediate taps and wherein a DC output voltage obtained by converting said DC input voltage Vin is output from the intermediate tap at least through a smoothing circuit.

DETAILED DESCRIPTION OF THE PREFERRED EMBODIMENTS

Embodiments of a switching power supply unit according to the invention will now be described with reference to the drawings.

(First Embodiment)

Figure 1:
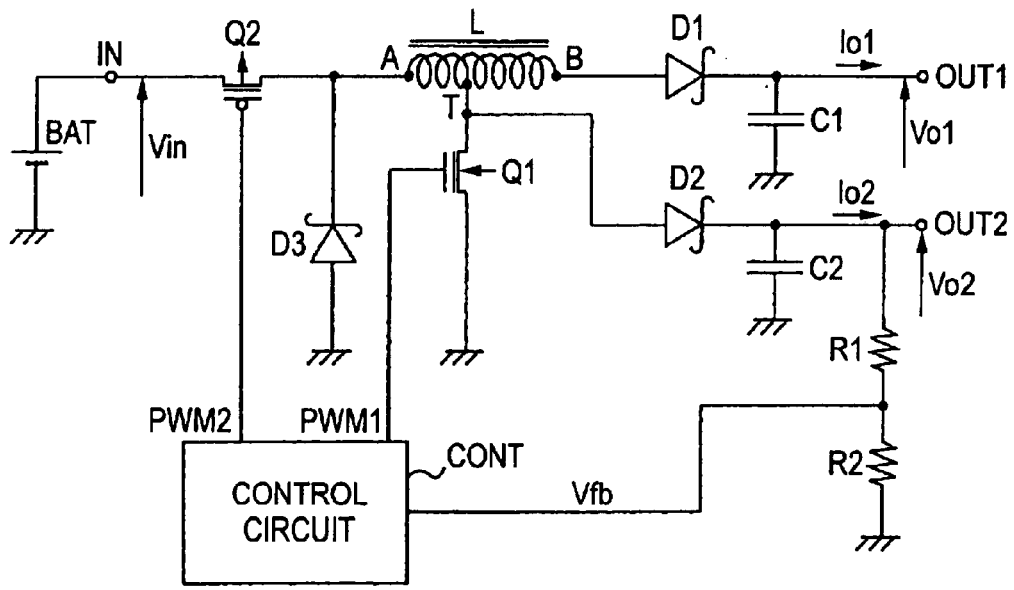
FIG. 1 is a configuration diagram of a switching power supply unit according to a first embodiment.
Figure 2:
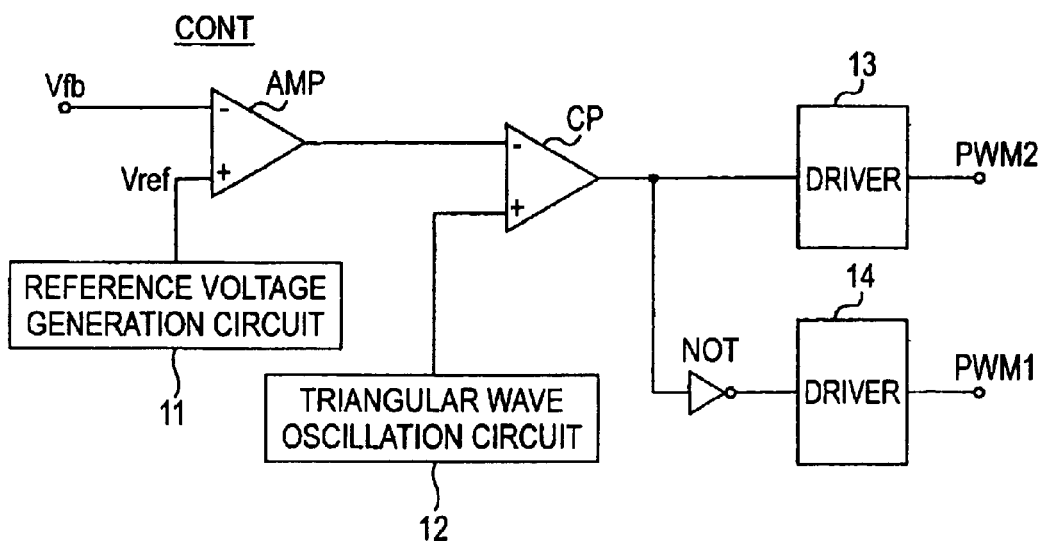
FIG. 2 is an internal configuration diagram of the control circuit in FIG. 1.
Figure 3:
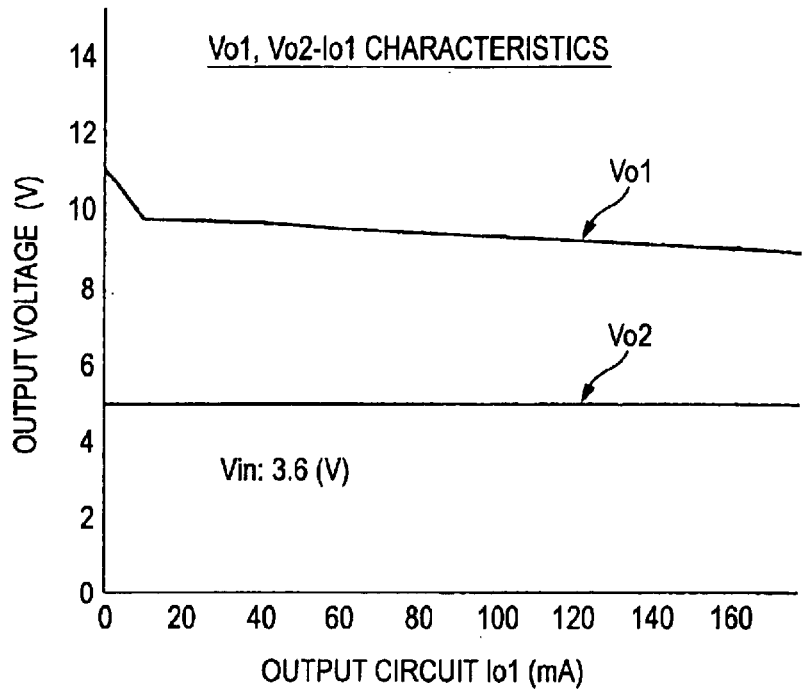
FIG. 3 shows output voltage versus output current characteristics in FIG. 1.
Figure 4:
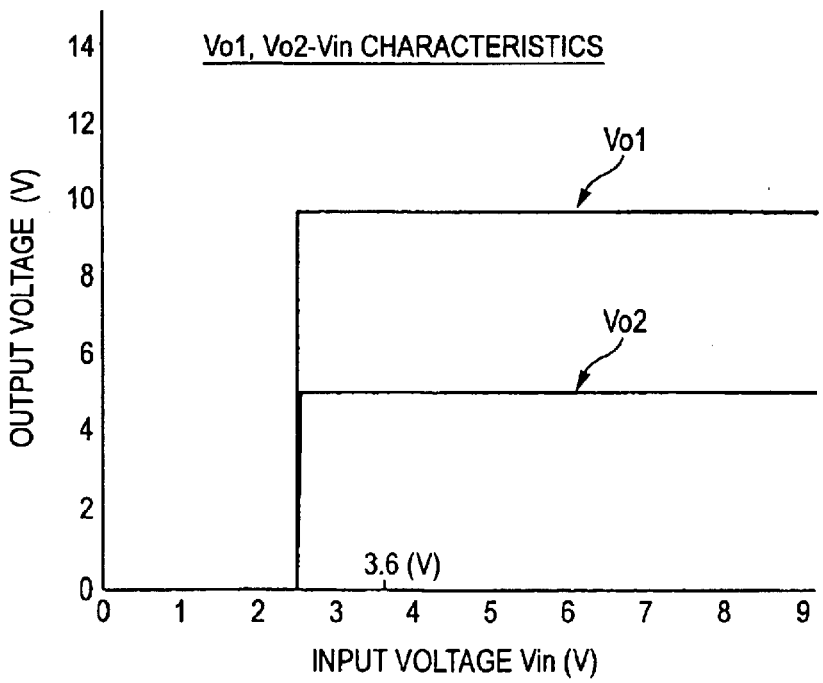
FIG. 4 shows output voltage versus input voltage characteristics in FIG. 1.

FIG. 1 illustrates a configuration of a switching power supply unit according to a first embodiment of the invention, and FIG. 2 illustrates an internal configuration of a control circuit in the same. FIG. 3 shows output voltage versus output current characteristics, and FIG. 4 shows output voltage versus input voltage characteristics. Basically, the switching power supply unit shown in FIG. 1 steps up a DC input voltage Vin to obtain DC output voltages Vo1, Vo2. As the DC output voltages may be obtained by decreasing the input voltage Vin through setting of conditions, no limitation is therefore placed on the voltage values.

In FIG. 1, a positive side of a battery BAT is connected to an input terminal IN, and a negative side of the battery BAT is connected to a ground as a common potential point. The DC input voltage Vin is thus applied to the input terminal IN.

A coil L, which winding is wound around a magnetic core, has a first terminal A, a second terminal B, and an intermediate tap T. The number of turns between the first terminal A and the intermediate tap T and the number of turns between the intermediate tap T and the second terminal B are in a 1 to n relationship. The first terminal A is connected to the input terminal IN through a second switch Q2 that is a P-type MOSFET (hereinafter, "PMOS"). A Schottky diode D3 is connected between the first terminal A and the ground in the polarity such that it blocks the input voltage Vin.

Since a forward voltage drop in a Schottky diode is considerably smaller than that in a PN-junction diode, a voltage generated (induced) therein can be effectively utilized, and a contribution is also made to improvement of efficiency because power loss by the voltage drop and the conduction current is small. It is therefore desirable that all other diodes used are Schottky diodes.

The second terminal B is connected to a first rectifier-smoother circuit comprised of a diode D1 and a capacitor C1, and a smoothed first DC output voltage Vo1 is output to a first output terminal OUT1.

The intermediate tap T is connected to the ground through a first switch Q1 that is an N-type MOSFET (hereinafter, "NMOS"). The intermediate tap T is connected to a second rectifier-smoother circuit comprised of a diode D2 and a capacitor C2, and a smoothed second DC output voltage Vo2 is output to a second output terminal OUT2.

A first switching signal PWM1 that is a first pulse width modulation signal from a control circuit CONT is supplied to a gate of the first switch Q1 which is thus switched on and off according to a high (H) level and a low (L) level of the switching signal PWM1.

A second switching signal PWM2 that is a second pulse width modulation signal from the control circuit CONT is supplied to a gate of the second switch Q2 which is thus switched on and off according to a high (H) level and a low (L) level of the switching signal PWM2. Since the switching signal PWM2 is formed in a reversed polarity of the switching signal PWM1, the first switch Q1 and the second switch Q2 consequently turn on and off simultaneously. By using the second switch Q2, which is a PMOS, in the power supply line, a voltage drop in the ON-state can be made small to utilize the input voltage Vin effectively.

A feedback voltage Vfb, which is divided the second output voltage Vo2 with voltage dividing resistors R1 and R2, is input to the control circuit CONT. The control circuit CONT compares the feedback voltage Vfb with a reference voltage to output the switching signal PWM1 and the switching signal PWM2.

FIG. 2 illustrates an example of a configuration of the control circuit CONT in which a difference between the feedback voltage Vfb and a reference voltage Vref generated by a reference voltage generation circuit 11 is amplified by an error amplifier AMP. An error signal output by the error amplifier AMP and a triangular wave signal generated by a triangular wave oscillation circuit 12 are compared by a comparator CP. The comparator CP outputs a pulse width modulation signal having a pulse width in accordance with the error signal. The output of the comparator CP is output as the switching signal PWM1 through a driver 13 and is output as the switching signal PWM2 through a inverter circuit (NOT Circuit) NOT and a driver 14.

In the switching power supply unit shown in FIG. 1, when the first switch Q1 and the second switch Q2 are turned on by the switching signal PWM1 and the switching signal PWM2, a current flows from the battery BAT to the coil L having the intermediate tap through a path formed by the second switch Q2, the first terminal A, the intermediate tap T, the first switch Q1, and the ground in this order, and the energy is thus accumulated in the coil L. At this time, the diode 1 and the diode 2 are off, and discharge currents from the capacitors C1 and C2 are supplied to an external load through the respective output terminals OUT1 and OUT2. The diode D3 is also off because it is reverse-biased.

When the switching signal PWM1 and the switching signal PWM2 are inverted to turn the first switch Q1 and the second switch Q2 off, the energy accumulated in the coil L is emitted as counter electromotive forces.

In this case, since the number of turns between the first terminal A and the intermediate tap T and the number of turns between the intermediate tap T and the second terminal B are in a 1 to n relationship, electromotive forces are induced according to the respective number-of-turns ratios. The diode D3 turns on because it is forward-biased. The capacitor C2 is charged through a path formed by the diode D3, the first terminal A, the intermediate tap T, the diode D2, the capacitor C2, and the ground. The capacitor C1 is charged through a path formed by the diode D3, the first terminal A, the second terminal B, the diode D1, the capacitor C1, and the ground.

The voltage charged at the capacitor C1 is output as the first output voltage Vo1 from the first output terminal OUT1, and the voltage charged at the capacitor C2 is output as the second output voltage Vo2 from the second output terminal OUT2.

In FIG. 1, since the second voltage Vo2 is fed back to the control circuit CONT as the feedback voltage Vfb, the first switch Q1 (and hence the second switch Q2 also) is controlled to turn on and off such that the second output voltage Vo2 becomes a predetermined value.

FIG. 3 shows an example of measurement of output voltage versus output current characteristics (i.e., load regulation) of the first embodiment.

In FIG. 3, the load regulation is shown by plotting a first output current Io1 from the first output terminal OUT1 along the abscissa and plotting the output voltages Vo1 and Vo2 along the ordinate. A second output current Io2 flowing from the second output terminal OUT2 is a predetermined constant current.

In FIG. 3, the input voltage Vin is 3.6 [v], whereas the second output voltage Vo2 is substantially 5.0 [v] throughout the current range because it is feedback-controlled and the first output voltage Vo1 that is not feedback-controlled stays in the range from 9.5 to 9.0 [v]. Similar load regulation characteristics were observed as a same result in which the first output current Io1 was a predetermined constant current; the second output current Io2 was plotted along the abscissa; and the output voltages Vo1 and Vo2 were plotted along the ordinate. The load regulation is sufficiently at a practical level.

Thus, both of the output voltages Vo1 and Vo2 output from the second terminal B and the intermediate tap T provide substantially satisfactory load regulation results.

Measurement results indicated high efficiency of 75% or more in a wide range of output currents and indicated a point value of about 77%.

Referring now to FIG. 1, voltages that can be output from the output terminals OUT1 and OUT2 will be discussed. Since feedback control is performed for the second output voltage Vo2, a duty ratio "Duty" for controlling the first switch Q1 is given by Equation (1) shown below.

$$\text{Duty}=Vo2/(Vin+Vo2) \quad (1)$$

The use of the duty ratio Duty is normally limited to the range from 10% to 90%. Therefore, a maximum value Vo2 (max) to which the second output voltage Vo2 can be stepped up is given by Equation (2) shown below.

$$Vo2(\max)=\{\text{Duty}(\max)/(100-\text{Duty}(\max))\}\times Vin=9\times Vin \quad (2)$$

Thus, a 9-fold voltage step-up substantially constitutes a limit to which the voltage can be stepped up.

Step-up ratio of the first output voltage Vo1 to the second output voltage Vo2 is determined by the number-of-turns ratio. When the number-of-turns ratio is 1:n, the first output voltage Vo1 is given by Equation (3) shown below.

$$Vo1=(1+n)\times Vo2 \quad (3)$$

The step-up ratio can therefore be increased by increasing the number-of-turns ratio n.

Thus, a simple configuration can be realized without providing any extra additional circuit such as a charge pump circuit. Further, an input voltage Vin can be converted into a plurality of output voltages Vo1, Vo2 at high efficiency.

FIG. 4 shows results of measurement of the output voltages Vo1 and Vo2 versus input voltage Vin characteristics, i.e., the line regulation in FIG. 1. As will be apparent from the characteristics shown in FIG. 4, even when the input voltage Vin changes, the value of the first output voltage Vo1 (about 9.8 [v]) that is not feedback-controlled and also the value of the second output voltage Vo2 (about 5 [v]) under feedback control do not change and remains constant.

That is, the first output voltage Vo1 and the second output voltage Vo2 have no voltage dependence on the input voltage Vin at all. In a portable apparatus employing a battery power supply, the no voltage dependence gives a meaning that a plurality of stable voltages can be used regardless of the consumption of the battery.

The following description will now be made on a reason for the fact that the first output voltage Vo1 and the second output voltage Vo2 have no voltage dependence according to the invention. First, when the energy accumulated in the coil L is emitted, since the diode D3 is provided, the potential at the first terminal A is limited by a forward voltage of the diode 3. Since the forward voltage of the diode D3 is very small, it is assumed here to be zero.

An induced voltage Vat between the first terminal A and the intermediate tap T and an induced voltage Vtb between the intermediate tap T and the second terminal B hold the relationship of the number-of-turns ratio 1 to n. That is, Vtb=n×Vat. Therefore, $$Vo2=Vat \quad (4)$$

$$Vo1=Vat+Vtb=(1+n)\times Vo2 \quad (5)$$

The first output voltage Vo1 and the second output voltage Vo2 are therefore independent of the input voltage Vin and are therefore constant.

On the contrary, when it is assumed that the diode D3 and the second switch Q2 are not provided, the second output voltage Vo2 and the first output voltage Vo1 are given as follows respectively.

$$Vo2=Vin+Vat \quad (6)$$

$$Vo1=Vin+Vat+Vtb=Vin+(1+n)\times Vat=Vin+(1+n)\times(Vo2-Vin)=(1+n)\times Vo2-N\times Vin \quad (7)$$

Thus, when the second output voltage Vo2 is feedback-controlled to be kept constant, the first output voltage Vo1 is dependent on the input voltage Vin.

The above discussion indicates that the dependence of the output voltages on the input voltage is determined by whether the potential at the first terminal A is turned to nearly zero potential by the diode D3 when the energy accumulated in the coil L is emitted. To state generally, the output voltages have no input voltage dependence when a potential at a point to serve as a reference is not related to the input voltage Vin at the time of the emission of the energy accumulated in the coil L.

In the first embodiment, the voltage dependence of the first output voltage Vo1 and the second output voltage Vo2 on the input voltage Vin is eliminated by providing the diode D3 and the second switch Q2 that turns on and off simultaneously with the first switch Q1.

In FIG. 4, the output of the first output voltage Vo1 and the second output voltage Vo2 is interrupted at a point where the input voltage Vin drops from the normal value 3.6 [v] to about 2.5[v]. The reason is that somewhat high voltage is required for a gate driving voltage Vgs because the first switch Q1 is MOSFET. Therefore, when a battery of 1.5[v] is used as the battery BAT for example, a bipolar transistor whose base driving voltage Vbe is as low as about 0.6 [v] may be used as the first switch Q1 to obtain a step-up voltage even from a lower input voltage Vin.

Accordingly, in each embodiment of the invention, NPN-type and PNP-type bipolar transistors may be used as the first switch Q1 and the second switch Q2.

(Second Embodiment)

Figure 5:
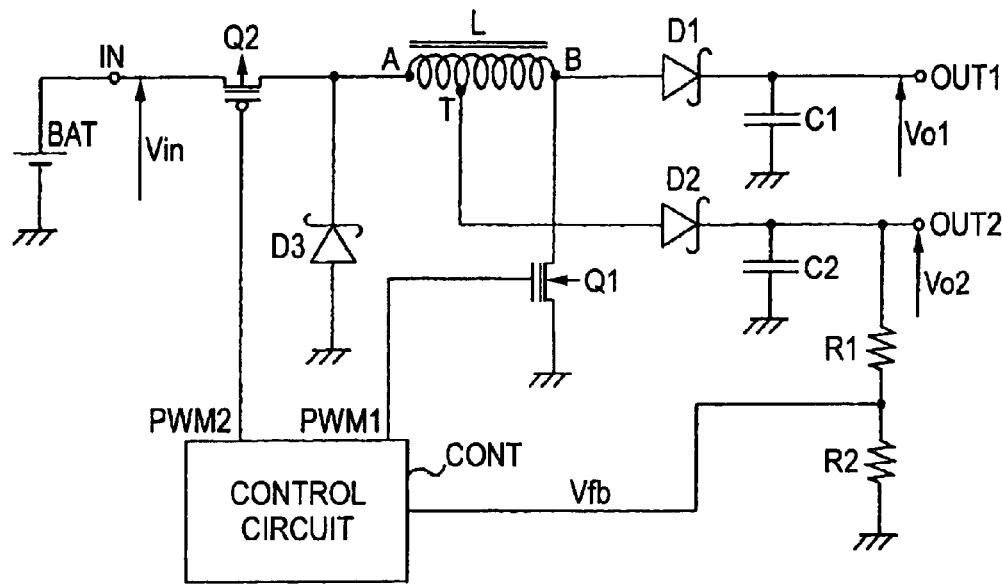
FIG. 5 is a configuration diagram of a switching power supply unit according to a second embodiment.

FIG. 5 illustrates a configuration of a switching power supply unit according to a second embodiment of the invention. In the second embodiment, the first switch Q1 turning on and off under control of the switching signal PWM1 is connected between the second terminal B of the coil L having an intermediate tap and the ground. The other configuration is similar to that in FIG. 1, and two output voltages Vo1 and Vo2 independent of the input voltage Vin are obtained.

Also in the switching power supply unit in FIG. 5, (i) load regulation is at a practical level; (ii) efficiency is as high as about 77%; and (iii) neither first output voltage Vo1 nor second output voltage Vo2 has input voltage dependence.

(Third Embodiment)

Figure 6:
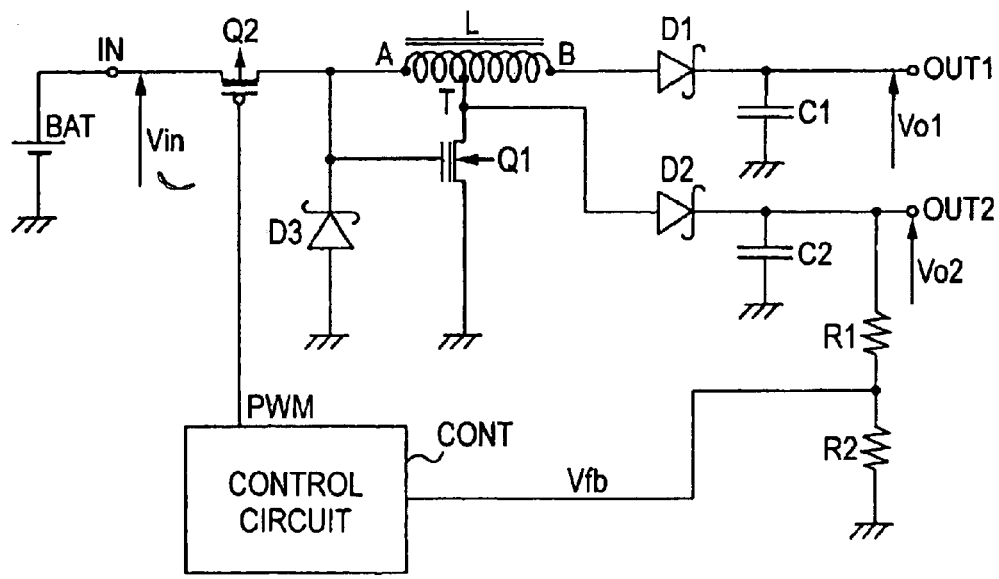
FIG. 6 is a configuration diagram of a switching power supply unit according to a third embodiment.

FIG. 6 illustrates a configuration of a switching power supply unit according to a third embodiment of the invention. The third embodiment is different from FIG. 1 in that the gate of the first switch Q1 is connected to the first terminal A of the coil L having an intermediate tap. Since the potential at the first terminal A equals an input voltage Vin when the second switch Q2 turns on and approximately equals the ground potential when the second switch Q2 is turned off, the first switch Q1 turns on and off substantially simultaneously with the second switch Q2. Therefore, the switching power supply unit of the third embodiment operates similarly to the first switching power supply unit in FIG. 1.

In the switching power supply unit in FIG. 6, since the gate of the first switch Q1 is connected to the first terminal A and is therefore connected to the ground through the diode 3, the control circuit CONT outputs only one switching signal PWM1. Thus, it is required to provide only one driver in the control circuit CONT, and an IC that contains the control circuit CONT is required to have only one output pin (output terminal) for outputting a switching signal PWM. The reduction in the numbers of drivers and output pins is similarly achieved in other embodiments that provide one switching signal PWM.

Also in the switching power supply unit in FIG. 6, (i) load regulation is at a practical level; (ii) efficiency is as high as about 77%; and (iii) neither first output voltage Vo1 nor second output voltage Vo2 has input voltage dependence.

(Forth Embodiment)

Figure 7:
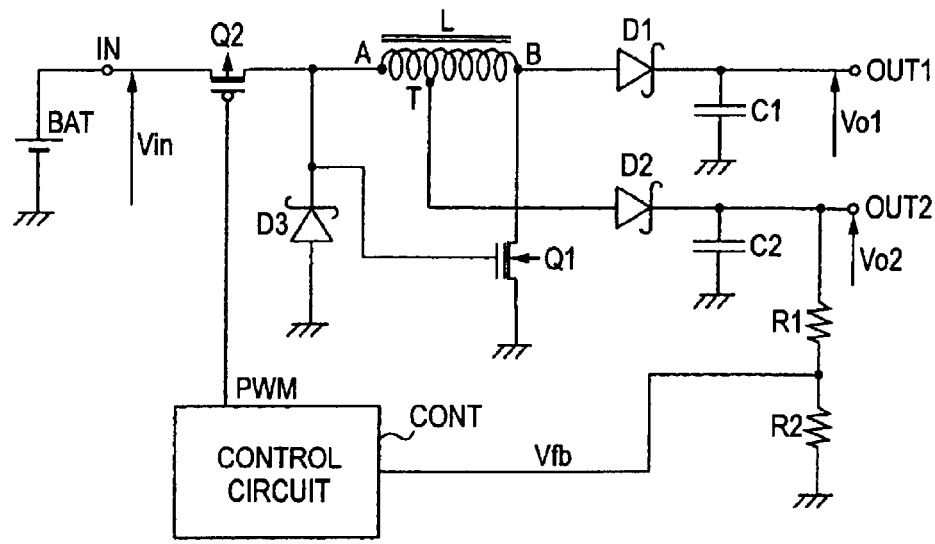
FIG. 7 is a configuration diagram of a switching power supply unit according to a fourth embodiment.

FIG. 7 illustrates a configuration of a switching power supply unit according to a fourth embodiment of the invention. The fourth embodiment is different from FIG. 5 in that the gate of the first switch Q1 is connected to the first terminal A of the coil L having an intermediate tap. Since the potential at the first terminal A equals the input voltage Vin when the second switch Q2 turns on and approximately equals the ground potential when the second switch Q2 turns off, the first switch Q1 turns on and off substantially simultaneously with the second switch Q2. Therefore, the switching power supply unit of the forth embodiment operates similarly to the first switching power supply unit in FIG. 1.

Also in the switching power supply unit in FIG. 7, (i) load regulation is at a practical level; (ii) efficiency is as high as about 77%; and (iii) neither first output voltage Vo1 nor second output voltage Vo2 has input voltage dependence.

In the first to fourth embodiments (FIG. 1 and FIGS. 5 to 7), the second output voltage Vo2 is feedback-controlled. The first output voltage Vo1 may alternatively be feedback-controlled.

In the first to fourth embodiments (FIG. 1 and FIGS. 5 to 7), the first output voltage Vo1 and the second output voltage Vo2 can be output at desired values according to the setting of the feedback voltage Vfb and the reference voltage Vref. It is therefore possible to output two step-up output voltages or a combination of a step-down output voltage and a step-up output voltage for which the input voltage Vin serves as a reference. It is further possible to output two step-down output voltages.

Since the output voltages Vo1 and Vo2 have no input voltage dependence, the output voltages Vo1 and the output voltages Vo2 can be output at prescribed desired values even when the input voltage Vin drops. In other words, even when a battery power supply such as a lithium battery is used as the power supply and is consumed to result in a drop of the input voltage Vin, the ratios of conversion from the input voltage Vin to the output voltages Vo1 and Vo2, i.e., the step-up ratios, step-down ratios, or step-up and step-down ratios are automatically and accurately adjusted. The automatic and accurate adjustment of the conversion ratios is similarly achieved in other embodiments of the invention.

(Fifth Embodiment)

Figure 8:
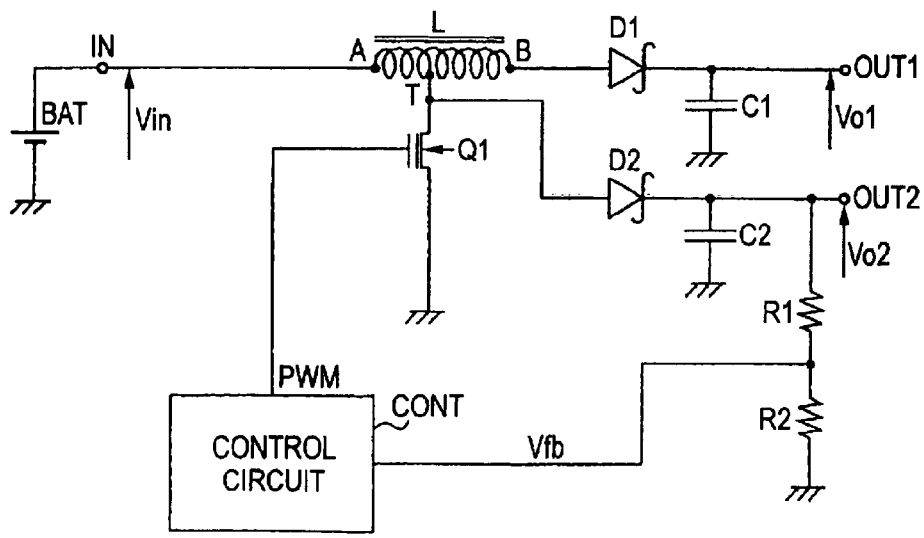
FIG. 8 is a configuration diagram of a switching power supply unit according to a fifth embodiment.

FIG. 8 illustrates a configuration of a switching power supply unit according to a fifth embodiment of the invention. The fifth embodiment is different from the switching power supply unit in FIG. 1 in that the second switch Q2 is deleted to connect the input terminal IN and the first terminal A directly and in that the diode D3 is deleted.

In FIG. 8, since the second switch Q2 and the diode D3 are deleted, the potential at the first terminal A equals the input voltage Vin when the energy accumulated in the coil L having an intermediate tap is emitted. This is a state as represented by Equation (7) above.

Therefore, the first output voltage Vo1 that is not feedback-controlled has input voltage dependence. In the switching power supply unit in FIG. 8, (i) load regulation is at a practical level; (ii) efficiency is as very high as about 88%; and (iii) the second output voltage Vo2 has no input voltage dependence whereas the first output voltage Vo1 that is not feedback-controlled has input voltage dependence.

Therefore, the switching power supply unit in FIG. 8 can be used as a highly efficient multi-output power supply unit when changes in the input voltage Vin are small or when fluctuation of the output voltages is permitted to some degree. Further, the configuration of the switching power supply unit in FIG. 8 can be simple because the number of components such as switches and diodes can be small.

(Sixth Embodiment)

Figure 9:
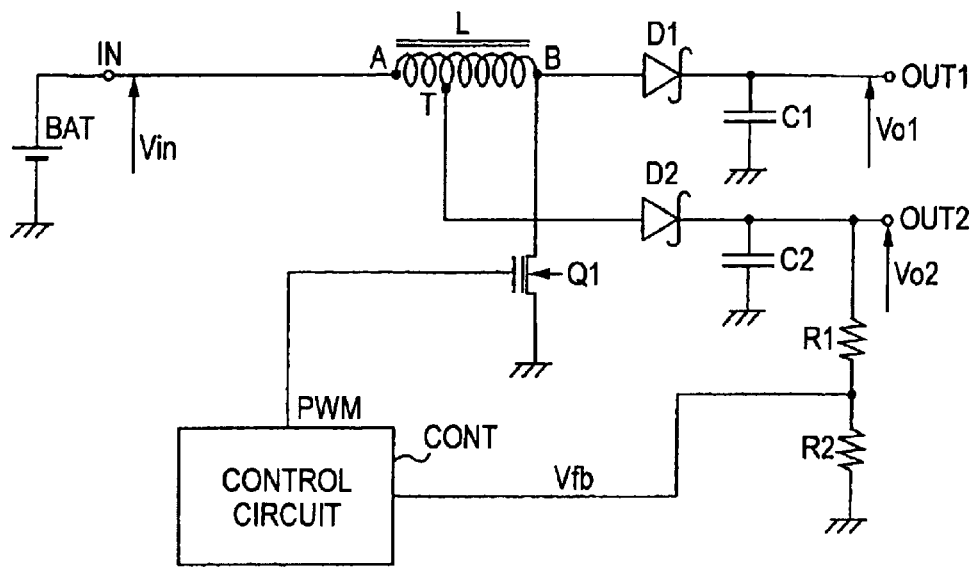
FIG. 9 is a configuration diagram of a switching power supply unit according to a sixth embodiment.

FIG. 9 illustrates a configuration of a switching power supply unit according to a sixth embodiment of the invention. The sixth embodiment is different from the switching power supply unit in FIG. 5 in that the second switch Q2 is deleted to connect the input terminal IN and the first terminal A directly and in that the diode D3 is deleted. Therefore, the first output voltage Vo1 that is not feedback-controlled has input voltage dependence similarly to the case in FIG. 8.

In the switching power supply unit in FIG. 9, (i) load regulation is at a practical level; (ii) efficiency is as very high as about 88%; and (iii) the second output voltage Vo2 has no input voltage dependence whereas the first output voltage Vo1 that is not feedback-controlled has input voltage dependence.

Therefore, the switching power supply unit in FIG. 8 can be used as a highly efficient multi-output power supply unit when changes in the input voltage Vin are small changes or when fluctuation of the output voltages is permitted to some degree. Further, the configuration of the switching power supply unit in FIG. 8 can be simple because the number of components such as switches and diodes can be small.

In the above fifth and sixth embodiments (FIGS. 8 and 9), the second output voltage Vo2 is feedback-controlled. The first output voltage Vo1 may alternatively be feedback-controlled. In the fifth and sixth embodiments (FIGS. 8 and 9), when the input voltage Vin is regarded as a reference, two step-up output voltages Vo1 and Vo2 having desired values higher than the input voltage Vin can be output.

(Seventh Embodiment)

Figure 10:
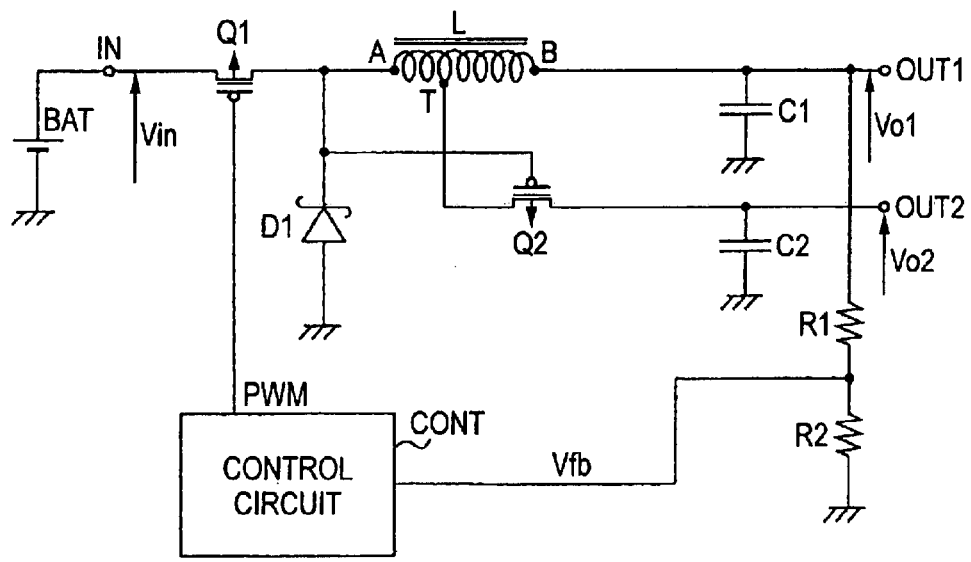
FIG. 10 is a configuration diagram of a switching power supply unit according to a seventh embodiment.

FIG. 10 illustrates a configuration of a switching power supply unit according to a seventh embodiment of the invention which outputs a plurality of output voltages Vo1 and Vo2 obtained by decreasing an input voltage Vin.

In FIG. 10, a positive side of a battery BAT is connected to an input terminal IN, and a negative side of the same is connected to the ground that is a common potential point. As a result, the input voltage Vin is applied to the input terminal IN.

A coil L having an intermediate tap is same with that in FIG. 1. A first terminal A is connected to the input terminal IN through a first switch Q1 that is a PMOS. A diode D1 is connected between the first terminal A and the ground such that it has polarity to block the input voltage Vin.

A second terminal B is connected to a smoother circuit constituted by a capacitor C1, and a smoothed output voltage Vo1 is output to a first output terminal OUT1. Since the first output voltage Vo1 is feedback-controlled to become a step-down voltage, a rectifying diode that is normally provided between the second terminal and the capacitor C1 is deleted.

An intermediate tap T is connected to a smoother circuit constituted by a capacitor C2 through a second switch Q2 that is a PMOS, and a smoothed second output voltage Vo2 is output to a second output terminal OUT2. A gate of the second switch Q2 is connected to the first terminal A.

A switching signal PWM that is a pulse width modulation signal from a control circuit CONT is supplied to a gate of the first switch Q1 which is switched on and off according to an L level and an H level of the switching signal PWM.

A feedback signal Vfb, which is divided the first output voltage Vo1 with voltage dividing resistors R1 and R2, is input to the control circuit CONT. The control circuit CONT compares the feedback voltage Vfb with a reference voltage to output the feedback signal PWM.

In the switching power supply unit in FIG. 10, when the first switch Q1 is turned on by the switching signal PWM, the second switch Q2 is turned off. Then, a current flows from the battery BAT to the coil L through a path formed by the first switch Q1, the first terminal A, the second terminal B, the capacitor C1, and the ground, and the energy is thus accumulated in the coil L. At this time, the diode D1 is off.

When the switching signal PWM is inverted to turn the first switch Q1 off, the second switch Q2 turns on. Then, the energy accumulated in the coil L is emitted to the capacitor C2 through a path formed by the diode D1, the first terminal A, the intermediate tap T, the second switch Q2, the capacitor C2, and the ground. The energy is also emitted to the capacitor C1 through a path formed by the diode D1, the first terminal A, the second terminal B, the capacitor C1, and the ground.

In the switching power supply unit in FIG. 10, the input voltage Vin is converted into a square wave by turning the first switch Q1 on and off, smoothed by a low-pass filter formed by the inductance of the coil L and the capacitance of the capacitor C1, C2, and output as the first output voltage Vo1 and the second output voltage Vo2. Therefore, the step-down type switching power supply unit in FIG. 10 provides step-down output voltages unlike the switching power supply unit in FIG. 1 that provides arbitrary output voltages.

In FIG. 10, since the first output voltage Vo1 is fed back to the control circuit CONT as the feedback voltage Vfb, the first switch Q1 is controlled to turn on and off (with the second switch Q2 therefore inverted) such that the first output voltage Vo1 becomes a predetermined value. The on-off control of the second switch Q2 may be directly effected by a signal from the control circuit CONT.

Referring to the path of the second output voltage Vo2 that is not feedback-controlled during the control over the switching power supply unit in FIG. 10, the second switch Q2 is off when the energy is accumulated in the coil L. The second switch Q2 is on when the input voltage Vin is not applied to the first terminal A. Therefore, the second output voltage Vo2 has no input voltage dependence because it does not fluctuate even when there is a change in the input voltage Vin.

In the switching power supply unit in FIG. 10, (i) load regulation is at a practical level; (ii) efficiency is as very high as about 90%; and (iii) neither first output voltage Vo1 nor second output voltage Vo2 has input voltage dependence. It is thus possible to obtain a first output voltage Vo1 and a second output voltage Vo2 that are two stable step-down outputs.

(Eighth Embodiment)

Figure 11:
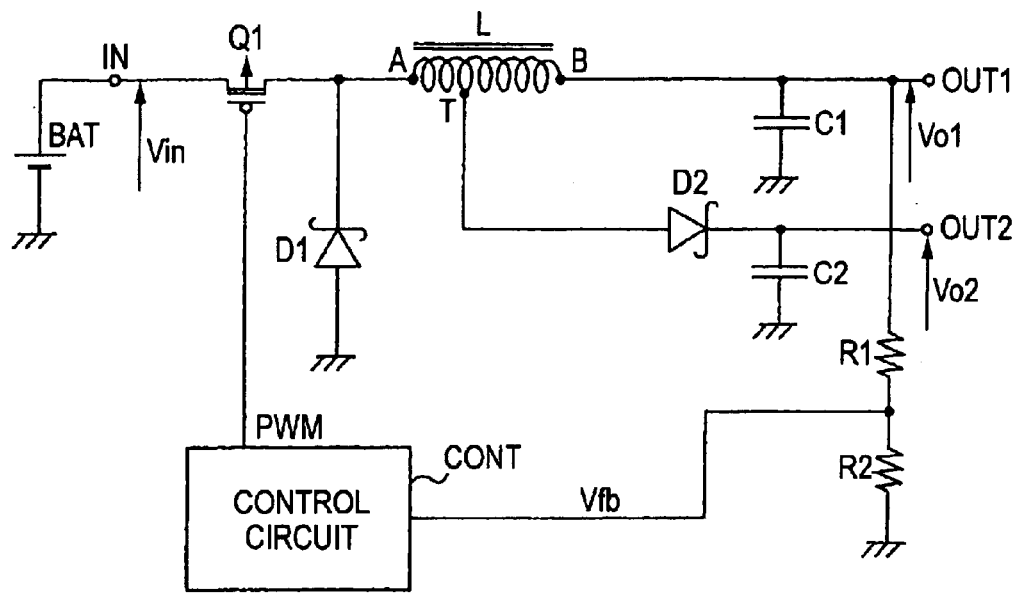
FIG. 11 is a configuration diagram of a switching power supply unit according to an eighth embodiment.

FIG. 11 illustrates a configuration of a switching power supply unit according to an eighth embodiment of the invention which outputs a plurality of output voltages obtained by decreasing an input voltage similarly to that shown in FIG. 10.

The configuration in FIG. 11 is different from FIG. 10 in that a diode D2 is provided instead of the second switch Q2 in FIG. 10. As a result, the input voltage Vin is supplied to the path of the second output voltage Vo2 that is not feedback-controlled when the first switch Q1 is on. Therefore, the second output voltage Vo2 has input voltage dependence because it is affected by changes in the input voltage Vin.

In the switching power supply unit in FIG. 11, (i) load regulation is at a practical level; (ii) efficiency is as high as about 80%; and the first output voltage Vo1 has no input voltage dependence whereas the second output voltage Vo2 that is not feedback-controlled has input voltage dependence.

Therefore, the switching power supply unit in FIG. 11 can be used as a multi-output power supply unit with step-down outputs when changes in the input voltage Vin are small or when fluctuation of the output voltages is permitted to some degree.

(Ninth Embodiment)

Figure 12:
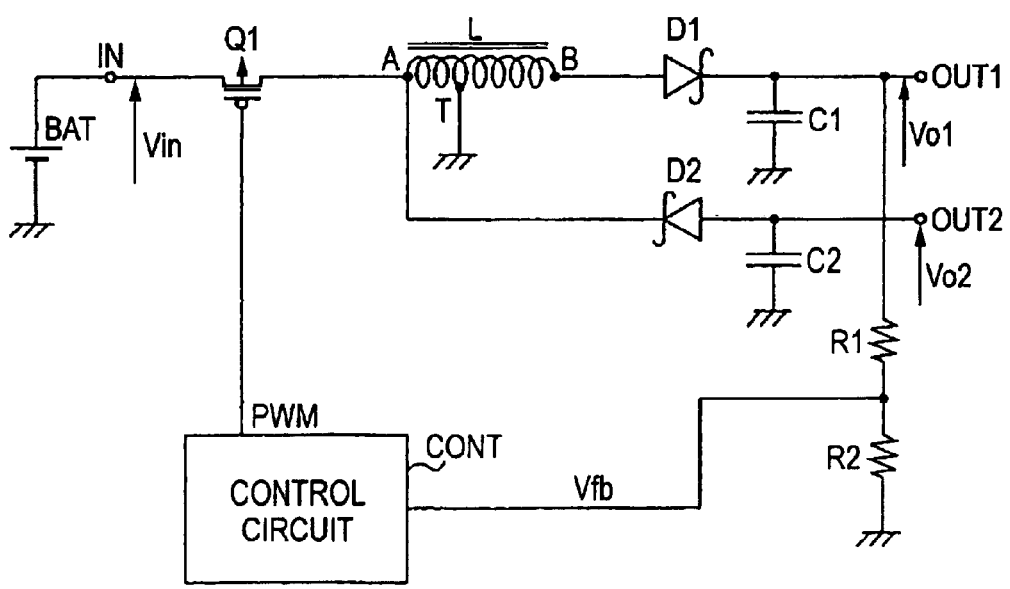
FIG. 12 is a configuration diagram of a switching power supply unit according to a ninth embodiment.

FIG. 12 illustrates a configuration of a switching power supply unit according to a ninth embodiment of the invention which outputs an output voltage Vo2 of the opposite polarity obtained by inverting an input voltage Vin and an output voltage Vo1 of the same polarity obtained by stepping up or decreasing the input voltage Vin. That is, Vo1>0, and Vo2<0.

In FIG. 12, a positive side of a battery BAT is connected to an input terminal IN, and a negative side of the battery BAT is connected to the ground that is a common potential point. The input voltage Vin is thus applied to the input terminal IN.

A coil L having an intermediate tap is similar to that in FIG. 1. A first terminal A is connected to the input terminal IN through a first switch Q1 that is a PMOS. A diode D2 is provided between a second output terminal OUT2 and the first terminal A such that it has polarity to allow conduction toward the first terminal A, and a capacitor C2 is provided between the second output terminal OUT2 and the ground. An intermediate tap T is directly connected to the ground.

A diode D1 is provided between the first output terminal OUT1 and the second terminal B such that it has polarity to allow conduction toward the first terminal OUT1, and a capacitor C1 is provided between the output terminal OUT1 and the ground.

A switching signal PWM that is a pulse width modulation signal from a control circuit CONT is supplied to a gate of the first switch Q1 which is thereby switched on and off according to an L level and an H level of the switching signal PWM.

A feedback voltage Vfb, which is divided the first output voltage Vo1 with voltage dividing resistors R1 and R2, is input to the control circuit CONT. The control circuit CONT compares the feedback voltage Vfb with a reference voltage and outputs the switching signal PWM. The second output voltage Vo2 may be used as the feedback voltage Vfb.

In the switching power supply unit in FIG. 12, when the first switch Q1 is turned on by the switching signal PWM, a current flows from the battery BAT to the coil L through a path formed by the first switch Q1, the first terminal A, the intermediate tap T, and the ground, and the energy is accumulated in the coil L.

When the switching signal PWM is inverted to turn the first switch Q1 off, an counter electromotive force originating from the energy accumulated in the coil L charges the capacitor C1 with positive polarity through a path formed by the intermediate tap T, the second terminal B, the diode D1, the capacitor C1, and the ground. Simultaneously, the capacitor C2 is charged with negative polarity through a path formed by the intermediate tap T, the ground, the capacitor C2, the diode D2, the first terminal A, and the intermediate tap T.

In the case of the switching power supply unit in FIG. 12 which outputs output voltages having positive and negative polarities, since the ground that is independent of the input voltage Vin serves as a reference point when the energy accumulated in the coil L is emitted, neither first output voltage Vo1 nor second output voltage Vo2 has input voltage dependence.

In the switching power supply unit in FIG. 12, (i) load regulation is at a practical level; (ii) efficiency is as high as about 80%; and (iii) neither first output voltage Vo1 nor second output voltage Vo2 has input voltage dependence. It is thus possible to obtain a positive output voltage Vo1 and a negative output voltage Vo2 each of which is stable.

(Tenth Embodiment)

Figure 13:
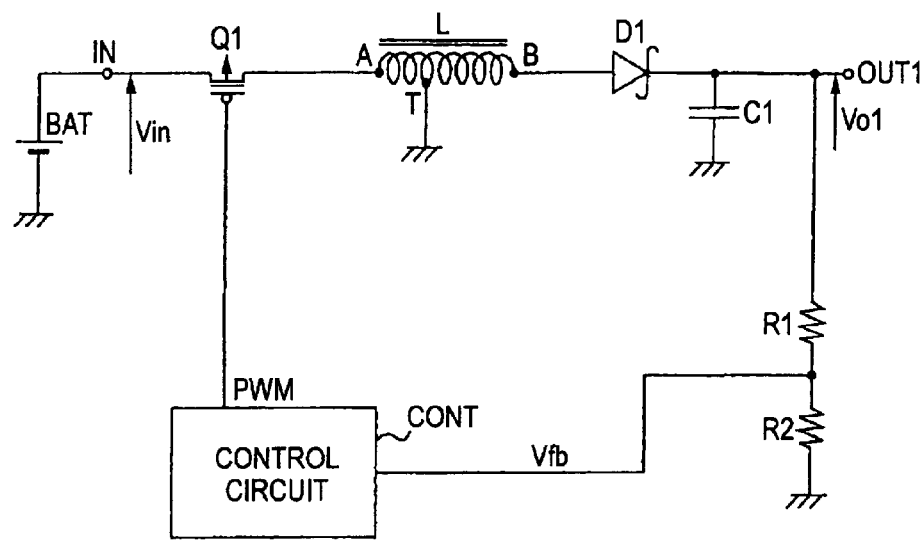
FIG. 13 is a configuration diagram of a switching power supply unit according to a tenth embodiment.

FIG. 13 illustrates a configuration of a switching power supply unit according to a tenth embodiment of the invention. FIG. 13 shows a switching power supply unit configured to provide a single output that is the first output voltage Vo1 by deleting the system for the second output terminal OUT2 (specifically, the diode D2 and the capacitor C2) in FIG. 12. In the single output switching power supply unit, the feedback voltage Vfb or the reference voltage Vref of the control circuit CONT can be controlled to make the first output voltage Vo1 higher or lower than the input voltage Vin. It is therefore possible to provide step-up/down type single output switching power supply unit which provides an output voltage having arbitrary value which can be lower or higher than the input voltage Vin.

In the switching power supply unit in FIG. 13, when the input voltage Vin drops as a result of battery consumption while the input voltage Vin from the battery power supply (that is a lithium battery, for example) is, for example, stepped down to output a predetermined output voltage Vo1 (Vin>Vo1 at this time), the input voltage Vin is conversely stepped up to output the predetermined output voltage Vo1 (Vin 21 Vo1 at this time). Thus, the switching power supply unit in FIG. 13 operates as a step-up/down type single output switching power supply unit capable of both increasing and decreasing a voltage such that a predetermined output voltage Vo1 is automatically output depending on fluctuation of the input voltage Vin.

In the switching power supply unit in FIG. 13, (i) load regulation is at a practical level; (ii) efficiency is as high as about 74%; and (iii) the output voltage Vo1 has no input voltage dependence. Further, it is possible to obtain a stable output voltage Vo1 which has been stepped up or down depending on fluctuation of the input voltage Vin.

(Eleventh Embodiment)

Figure 14:
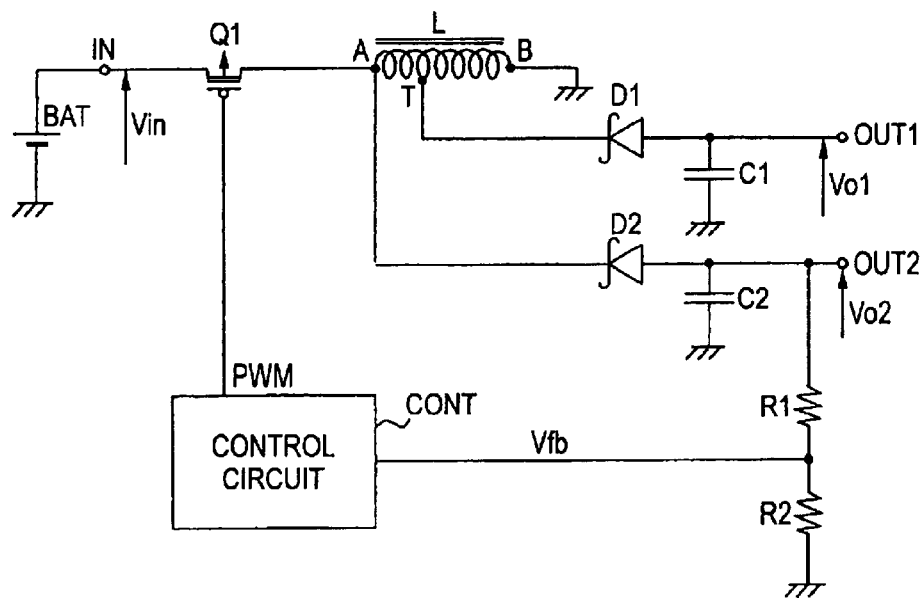
FIG. 14 is a configuration diagram of a switching power supply unit according to an eleventh embodiment.

FIG. 14 illustrates a configuration of a switching power supply unit according to an eleventh embodiment of the invention, which outputs a plurality of output voltages Vo1, Vo2 having the reverse polarity obtained by inverting an input voltage Vin. That is, Vo2<Vo1<0.

In FIG. 14, a positive side of a battery BAT is connected to an input terminal IN, and a negative side of the battery BAT is connected to the ground that is a common potential point. An input voltage Vin is thus input to the input terminal IN.

A coil L having an intermediate tap is same with that in FIG. 1. A first terminal A is connected to the input terminal IN through a first switch Q1 that is a PMOS. A second terminal B is directly connected to the ground.

A diode D2 is provided between a second output terminal OUT2 and the first terminal A such that it has polarity to allow conduction toward the first terminal A, and a capacitor C2 is provided between the second output terminal OUT2 and the ground. A diode D1 is provided between the first output terminal OUT1 and an intermediate tap T such that it has polarity to allow conduction toward the intermediate tap T, and a capacitor C1 is provided between a first output terminal OUT1 and the ground.

A switching signal PWM that is a pulse width modulation signal from a control circuit CONT is supplied to a gate of the first switch Q1 which is thus switched on and off according to an L level and an H level of the switching signal PWM.

A feedback voltage Vfb, which is divided the second output voltage Vo2 with voltage dividing resistors R1 and R2, is input to the control circuit CONT. The control circuit CONT compares the feedback voltage Vfb with a reference voltage to output the switching signal PWM.

In the switching power supply unit in FIG. 14, when the first switch Q1 is turned on by the switching signal PWM, a current flows from the battery BAT to the coil L via the first switch Q1, the first terminal A, the second terminal B, and the ground, and the energy is accumulated in the coil L.

When the switching signal PWM is inverted to turn the first switch Q1 off, an counter electromotive force originating from the energy accumulated in the coil L charges the capacitor C1 with negative polarity through a path formed by the ground, the capacitor C1, the diode D1, the intermediate tap T, the second terminal B, and the ground. Simultaneously, the capacitor C2 is also charged with negative polarity through a path formed by the ground, the capacitor C2, the diode D2, the first terminal A, the second terminal B, and the ground.

In the switching power supply unit in FIG. 14 which outputs two output voltages having the negative polarity, since the ground that is independent of the input voltage Vin serves as a reference point when the energy accumulated in the coil L is emitted, neither first output voltage Vo1 nor second output voltage Vo2 has input voltage dependence.

In the switching power supply unit in FIG. 14, (i) load regulation is at a practical level; (ii) efficiency is as high as about 80%; and (iii) neither first output voltage Vo1 nor second output voltage Vo2 has input voltage dependence. It is thus possible to obtain a positive output voltage Vo1 and a negative output voltage Vo2 each of which is stable. The output voltage Vo1 is not necessarily required to be a step-up voltage.

(Twelfth Embodiment)

Figure 15:
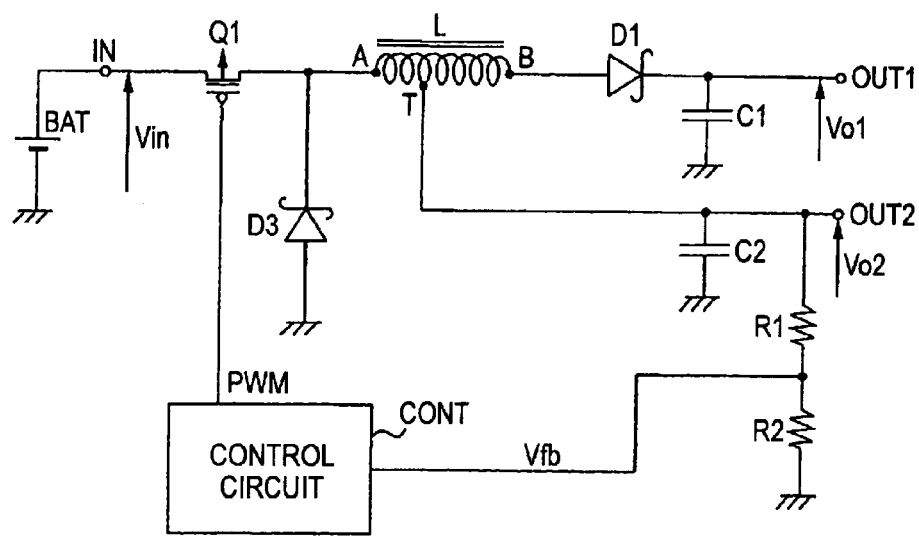
FIG. 15 is a configuration diagram of a switching power supply unit according to a twelfth embodiment.

FIG. 15 illustrates a configuration of a switching power supply unit according to a twelfth embodiment of the invention in which an input voltage Vin is stepped up to output an output voltage Vo1 and stepped down to output an output voltage Vo2. That is, Vo1>Vo2, and Vo2<Vin.

In FIG. 15, a positive side of a battery BAT is connected to an input terminal IN, and a negative side of the battery BAT is connected to the ground that is a common potential point. The input voltage Vin is thus input to the input terminal IN.

A coil L having an intermediate tap is same with that in FIG. 1. A first input terminal A is connected to the input terminal IN through a first switch Q1 that is a PMOS. A diode D3 is connected between the first terminal A and the ground such that it has polarity to block the input voltage Vin.

A second terminal B is connected to a smoother circuit constituted by a diode 1 and a capacitor C1, and a smoothed output voltage Vo1 is output to a first output terminal OUT1. An intermediate tap T is connected to a smoother circuit constituted by a capacitor C2, and a smoothed second output voltage Vo2 is output to a second output terminal OUT2.

A switching signal PWM that is a pulse width modulation signal from a control circuit CONT is supplied to a gate of the first switch Q1 which is thus switched on and off according to an L level and an H level of the switching signal PWM.

A feedback voltage Vfb, which is divided the second output voltage Vo2 with voltage dividing resistors R1 and R2, is input to the control circuit CONT. The control circuit CONT compares the feedback voltage Vfb with a reference voltage to output the switching signal PWM.

In the switching power supply unit in FIG. 15, when the first switch Q1 is turned on by the switching signal PWM, a current flows from the battery BAT to the coil L through a path formed by the first switch Q1, the first terminal A, the intermediate tap T, the capacitor C2, and the ground, and the energy is accumulated in the coil L. When normal feedback control is performed, the capacitor C1 is not charged because the capacitor C1 has already been charged to the first output voltage Vo1 that is higher than the second output voltage Vo2.

When the switching signal PWM is inverted to turn the first switch Q1 off, the energy accumulated in the coil L is emitted to the capacitor C2 through a path formed by the diode D3, the first terminal A, the intermediate tap T, the capacitor C2, and the ground. At this time, the capacitor C1 is charged through a path formed by the diode D3, the first terminal A, the second terminal B, the diode D1, the capacitor C1, and the ground.

In FIG. 15, since the second voltage Vo2 is fed back to the control circuit CONT as the feedback voltage Vfb, the first switched Q1 is controlled to turn on and off such that the second output voltage Vo2 becomes a predetermined value.

In the switching power supply unit in FIG. 15, since the second output voltage Vo2 is feedback-controlled, a current in accordance with a current output from the output terminal OUT2 flows between the first terminal A and the intermediate tap T of the coil L. A voltage is then induced at the second terminal B according to a number-of-turns ratio 1:n because of magnetic coupling between the region between the first terminal A and the intermediate tap T and the region between the intermediate tap T and the second terminal B. The induced voltage at the second terminal B is rectified and smoothed by the diode D1 and the capacitor C1. As a result, a step-up first output voltage is obtained. Since the ground serves as a reference point because of the diode D3, the first output voltage Vo1 has no input voltage dependence too.

In the switching power supply unit in FIG. 15, (i) load regulation is at a practical level; (ii) efficiency is as high as about 83%; and (iii) neither first output voltage Vo1 nor second output voltage has input voltage dependence. It is thus possible to obtain a second output voltage Vo2 that is a stable step-down output and a first output voltage Vo1 that is a stable step-up output.

(Thirteenth Embodiment)

Figure 16:
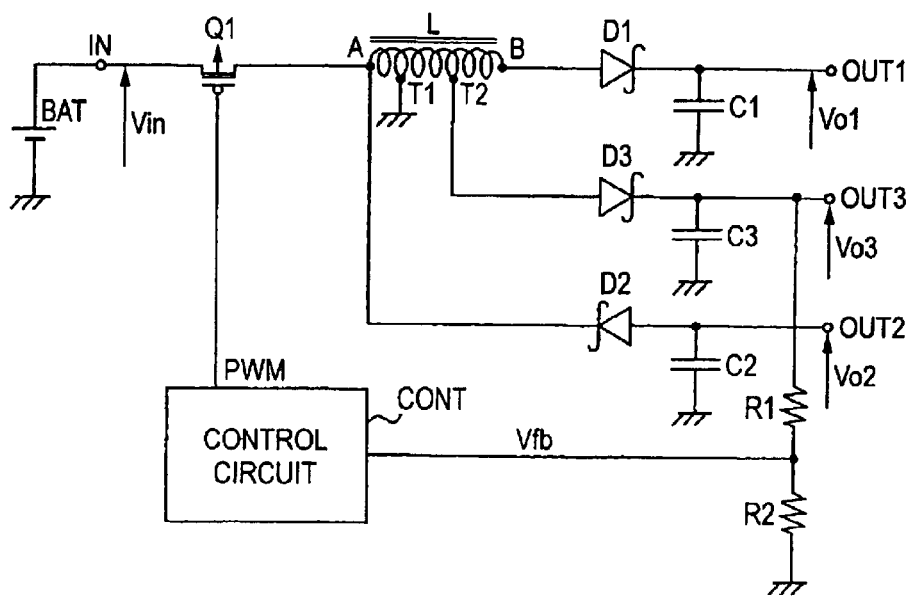
FIG. 16 is a configuration diagram of a switching power supply unit according to the invention having a multiplicity of outputs.

FIG. 16 shows that a switching power supply unit according to the invention, which is not limited to two outputs and may be have many outputs as three or more. Therefore, a coil L having an intermediate tap is not limited to the three-terminal type having a single intermediate tap and may be configured with four or more terminals including a plurality of intermediate taps.

By way of example, FIG. 16 shows a multi-output version with three outputs of the configuration of the switching power supply unit in FIG. 12 (the ninth embodiment) in which an input voltage Vin is inverted to output an output voltage Vo2 having the reverse polarity and a step-up output voltage Vo1.

In FIG. 16, two intermediate taps T1 and T2 are provided on a coil L having intermediate taps. The first intermediate tap T1 is connected to the ground. The configuration allows an output terminal OUT3 to output a third DC output voltage Vo3 having the positive polarity that comes from the second intermediate tap T2 through a rectifier-smoother circuit constituted by a diode D3 and a capacitor C3. Other embodiments may be similarly modified into a multi-output version having three or more outputs as described above.

As described above, compared with the switching power supply units of the related art, the switching power supply unit according to the invention has advantages including the capability of converting an input voltage into a plurality of output voltages with high efficiency, the capability of being made compact, and the fact that all of the output voltages have no input voltage dependence. Therefore, the switching power supply unit according to the invention is especially suitable as a power supply unit for a portable apparatus which must be compact and lightweight and whose battery power supply must have a long life. Although the switching power supply unit of the above embodiments PWM controls the DC input voltage to obtain the DC output voltage, it is not limited to PWM control.

What is claimed is:

1. A switching power supply unit comprising:
    a coil having a first terminal to which a DC input voltage is applied, a second terminal from which a first output voltage is outputted, and an intermediate tap from which a second output voltage is outputted;
    a first switch whose on-off state is controlled by an on-off control signal, which is connected between said intermediate tap or said second terminal and a common potential point;
    a first rectifying-smoothing circuit, which is connected to said second terminal, for rectifying and smoothing said first output voltage to output a first DC output voltage obtained by converting said DC input voltage;
    a second rectifying-smoothing circuit, which is connected to said intermediate tap, for rectifying and smoothing said second output voltage to output a second DC output voltage obtained by converting said input DC voltage; and
    control means for outputting said on-off control signal in order to control at least one of said first and second DC output voltages to be a constant voltage.

2. The switching power supply unit according to claim 1, further comprising:
    a second switch whose on-off state is controlled to apply said DC input voltage to said first terminal; and
    a rectifier element, which is connected between said first terminal and said common potential point such that it has polarity to block said DC input voltage, for rectifying the DC input voltage,
    wherein said control means outputs said on-off control signal such that said second switch is simultaneously switched with said first switch.

3. The switching power supply unit according to claim 2, wherein said second switch is switched according to said on-off control signal and said first switch is switched according to a voltage at said first terminal.

4. The switching power supply unit according to claim 1, wherein said coil has one or more further intermediate taps and wherein a DC output voltage obtained by converting said DC input voltage is output from the intermediate tap at least through a smoothing circuit.

5. A switching power supply unit comprising:
    a first switch whose on-off state is controlled by an on-off control signal, which outputs a DC input voltage according to the on-off state;

a coil having a first terminal to which the DC input voltage is applied, a second terminal from which a first output voltage is outputted, and an intermediate tap from which a second output voltage is outputted;

a rectifier element, which is connected between said first terminal and a common potential point such that it has polarity to block said DC input voltage, for rectifying the DC input voltage;

a smoothing circuit, which is connected to said second terminal, for smoothing said first output voltage to output a first DC output voltage obtained by decreasing said DC input voltage;

a rectifying-smoothing circuit, which is connected to said intermediate tap, for rectifying and smoothing said second output voltage to output a second DC output voltage obtained by decreasing said DC input voltage; and control means for outputting said on-off control signal in order to control at least one of said first and second DC output voltages to be a constant voltage.

6. The switching power supply unit according to claim 5, wherein said coil has one or more further intermediate taps and wherein a DC output voltage obtained by converting said DC input voltage is output from the intermediate tap at least through a smoothing circuit.

7. A switching power supply unit comprising:

a first switch for switching a DC input voltage on or off, based on an on-off control signal;

a coil having a first terminal to which the DC input voltage is applied, a second terminal from which a first output voltage is outputted, and an intermediate tap from which a second output voltage is outputted;

a rectifier element, which is connected between said first terminal and a common potential point such that it has polarity to block said DC input voltage, for rectifying the DC input voltage;

a first smoothing circuit, which is connected to said second terminal, for smoothing said first output voltage to output a first DC output voltage obtained by decreasing said DC input voltage;

a second smoothing circuit, which is connected to said intermediate tap through a second switch that is tuned off or on substantially oppositely to the turning on or off of said first switch, for smoothing said second output voltage to output a second DC output voltage obtained by decreasing said DC input voltage; and control means for outputting said on-off control signal in order to control at least one of said first and second DC output voltages to be a constant voltage.

8. The switching power supply unit according to claim 7, wherein said second switch is switched according to a voltage at said first terminal.

9. The switching power supply unit according to claim 7, wherein said coil has one or more further intermediate taps and wherein a DC output voltage obtained by converting said DC input voltage is output from the intermediate tap at least through a smoothing circuit.

10. A switching power supply unit comprising:

a first for switching a DC input voltage on or off, based on an on-off control signal;

a coil having a first terminal to which the DC input voltage is applied, a second terminal from which a first output voltage is outputted, and an intermediate tan connected to a common potential point;

a first rectifying-smoothing circuit, which is connected to said second terminal, for rectifying and smoothing said first output voltage to output a DC output voltage obtained by converting said DC input voltage;

control means for outputting said on-off control signal in order to control said DC output voltage to be a constant voltage; and a second rectifying-smoothing circuit, which is connected to said first terminal, for outputting a voltage with reversed polarity of the DC output voltage outputted from said first rectifying-smoothing circuit, wherein said first rectifying-smoothing circuit outputs a DC output voltage of the same polarity as the polarity of said DC input voltage, and said second rectifying-smoothing circuit outputs a DC output voltage of different polarity as the polarity of said DC input voltage.

11. The switching power supply unit according to claim 10, wherein said coil has one or more further intermediate taps and wherein a DC output voltage obtained by converting said DC input voltage is output from the intermediate tap at least through a smoothing circuit.

12. A switching power supply unit comprising:

a first switch for switching a DC input voltage on or off, based on an on-off control signal;

a coil having a first terminal to which the DC input voltage is applied, a second terminal connected to a common potential point, and an intermediate tap from which a first output voltage is outputted;

a first rectifying-smoothing circuit, which is connected to said intermediate tap, for rectifying and smoothing said first output voltage to output a first DC output voltage of polarity different from the polarity of said DC input voltage;

a second rectifying-smoothing circuit, which is connected to said first terminal, for rectifying and smoothing said second output voltage to output a second DC output voltage of polarity different from the polarity of said DC input voltage; and control means for outputting said on-off control signal in order to control at least one of said first and second DC output voltages to be a constant voltage.

13. The switching power supply unit according to claim 12, wherein said coil has one or more further intermediate taps and wherein a DC output voltage obtained by converting said DC input voltage is output from the intermediate tap at least through a smoothing circuit.

14. A switching power supply unit comprising:

a first switch for switching a DC input voltage on or off, based on an on-off control signal;

a coil having a first terminal to which the DC input voltage is applied, a second terminal from which a first output voltage is outputted, and an intermediate tap from which a second output voltage is outputted;

a rectifier element, which is connected between said first terminal and a common potential point such that it has polarity to block said DC input voltage, for rectifying the DC input voltage;

a smoothing circuit, which is connected to said intermediate tap, for smoothing said second output voltage to output a first DC output voltage obtained by decreasing said DC input voltage;

a rectifying-smoothing circuit, which is connected to said second terminal, for rectifying and smoothing said first, output voltage to output a second DC output voltage higher than said first DC output voltage outputted from said smoothing circuit; and control means for outputting said on-off control signal in order to control said first DC output voltage outputted from said smoothing circuit to be a constant voltage.

15. The switching power supply unit according to claim 14, wherein said coil has one or more further intermediate taps and wherein a DC output voltage obtained by converting said DC input voltage is output from the intermediate tap at least through a smoothing circuit.

* * * * *